United States Patent [19]

Bevan

[11] 4,290,444

[45] Sep. 22, 1981

[54] FLOW CONTROL DEVICE FOR USE WITH A BATTERY FORMATION TUB

[75] Inventor: William G. Bevan, Birdsboro, Pa.

[73] Assignee: General Battery Corporation, Reading, Pa.

[21] Appl. No.: 160,936

[22] Filed: Jun. 19, 1980

[51] Int. Cl.³ .............................................. F17D 1/00
[52] U.S. Cl. .................................... 137/255; 137/571; 137/577; 137/590; 320/2; 204/2.1
[58] Field of Search ............... 137/571, 577, 590, 269, 137/260, 255; 204/2.1; 429/120; 320/2

[56] References Cited

U.S. PATENT DOCUMENTS

| | | | |
|---|---|---|---|
| 647,388 | 4/1900 | Evans | 134/88 |
| 649,491 | 5/1900 | Sperry | 429/120 |
| 1,054,533 | 2/1913 | Greiner . | |
| 1,102,971 | 7/1914 | Williams . | |
| 1,472,454 | 10/1923 | Benedict | 134/201 |
| 2,321,176 | 6/1943 | Bloch | 4/206 |
| 2,364,144 | 12/1944 | Hunsaker | 429/120 X |
| 2,528,266 | 10/1950 | Dailey et al. | 320/15 X |
| 2,600,696 | 6/1952 | Schmidt | 134/182 |
| 3,326,264 | 6/1967 | Howard | 158/46.5 |
| 4,053,280 | 10/1977 | Salisbury | 134/135 X |
| 4,084,796 | 4/1978 | Krehbiel | 366/137 |
| 4,092,055 | 5/1978 | Wullenwaber | 312/229 |
| 4,117,387 | 9/1978 | Windisch | 204/2.1 X |
| 4,246,927 | 1/1981 | Eberle | 137/269 |

FOREIGN PATENT DOCUMENTS 2061781 6/1972 Fed. Rep. of Germany ........ 134/60

Primary Examiner—Alan Cohan
Attorney, Agent, or Firm—Benasutti Associates, Ltd.

[57] ABSTRACT

A flow control device adapted for use with a vertically aligned array of storage battery formation tubs, for controlling the fluid level within a formation tub, the flow device comprising a hollow cylindrical member capable of extending vertically between the drain of the formation tub in which the fluid level is to be controlled, and a second formation tub placed thereon; a first sleeve concentric with and slidingly engaging the upper portions of the cylindrical member and adapted to engage the drain of the upper formation tub; and a second sleeve concentric with and slidingly engaging the lower portions of the cylindrical member; wherein the second sleeve includes a first slot extending through the sleeve and to its lower most edge, and is capable of variably engaging second slots extending through the central portions of the cylindrical member to permit adjustment of the fluid level in the formation tub.

17 Claims, 3 Drawing Figures

FLOW CONTROL DEVICE FOR USE WITH A BATTERY FORMATION TUB

BACKGROUND OF THE INVENTION

This invention relates generally to the control of formation temperatures associated with the production of batteries during the neutralization, forming and charging stages and more particularly to an improved water flow device for use with a formation tub utilized in this process.

One problem often encountered in the battery industry relates to the control of temperature and time of battery formation. When electrolyte is first added to a previously unfilled, unformed battery it interacts with the paste on the plates contained within the battery, and a great deal of heat is generated. This heat is referred to as the heat of neutralization. Heat continues to be generated by the battery during the formation and charging process, particularly while a high current flow is present through the batteries. While it is possible to control the heat generated by using lower current rates, it is uneconomical to purchase and maintain sufficient equipment to form batteries at a current low enough to prevent this heating of the batteries.

Because of the heat generated during formation, a great deal of acid passes from the batteries into the surrounding environment. This is particularly true where, for economic reasons, a large number of batteries are being formed simultaneously in a minimum amount of forming room floor space. In addition, internal overheating of the batteries, if not properly controlled, can result in the damage or destruction of the battery.

Various means have been devised to cool batteries during the neutralization, formation, and charging process in order to avoid internal overheating of the batteries. The problem of dissipating heat which is generated during the formation of a battery has been aggravated by the widespread use of plastic battery cases throughout the automotive battery industry. Unlike the rubber, composition or glass cases previously used by the industry, plastic cases tend to have a low heat transfer coefficient which tends to insulate the interior of the battery, making it particularly susceptable to overheating problems.

Several approaches, such as circulating water baths in which batteries stand in rows of tanks permanently erected on the floor of the forming room, have been used in attempts to dissipate the heat produced when using high current during the battery neutralization, formation and charging process. While this has been successful, it is a highly restrictive technique and does not allow individual rectifying circuit control for batteries at various stages of neutralization, formation and charging.

Due to the relatively higher volumes of batteries produced, the use of plastic case designs and the various grid alloys and oxide mixtures now commonly used in the production of batteries, such prior art techniques have not proved satisfactory, and relatively long formation times have, therefore, been necessitated to insure that overheating does not occur during formation.

U.S. patent application Ser. No. 866,301, filed Jan. 3, 1978, discloses an apparatus which is useful in overcoming the above disclosed problems. In its preferred embodiment, the apparatus comprises a container means for holding a plurality of batteries in a pool of cooling fluid such as water, which partially surrounds the batteries. The batteries are electrically connected in series within the tub and are adapted to be connected to a single charging circuit for each tub of batteries. The apparatus further comprises a transport means for facilitating transportation of the container means with the batteries therein, and for adapting the container means for stacking in a vertical array.

In the preferred embodiment, the tub is made of molded plastic and comprises a flange along each side of the tub. At least a portion of the flange acts as a lip means for engaging the transport means. The transport means is a metal frame having a plurality of vertical posts at each of the corners of the frame, the posts being connected by side members which receive the lip means or flanges of the tub for aligning the tub within the frame. The frame also comprises a plurality of parallel, spaced transverse members located in a plane below the bottom of the tub for supporting the tub, and adapted to be engaged by a transportation mechanism such as a forklift truck for lifting the frame (with the tub and batteries) to stack it in a vertical array, or to move it to another part of the forming room floor.

In order to facilitate the stacking of the frames, one on top of the other, each post includes a tapered portion at one end which is adapted to engage hollow portions located at the other ends of the posts of a second frame which is to be placed above the first frame.

Each tub is filled with water when the forming process begins. This can be accomplished by filling the first tub with cooling fluid to a certain predetermined level, at which point the fluid is then allowed to overflow through an overflow opening or hole in the side of the tub, and from there, into the next lower adjacent tub. This process is repeated until the last tub is filled. At this point, the water overflows onto the forming room floor and is carried off to a cooling tower as described in U.S. Pat. No. 4,117,387. Alternatively, each of the tubs can be filled independently, or overflow could take place between two or more tubs with the overall array being filled at a number of places in the array. A variety of tub filling techniques may be used if desired.

Such an apparatus serves well in the formation of a maximum number of batteries in the minimum amount of forming room floor space. In addition, this apparatus greatly reduces the hazards attributable to the corrosive acid atmosphere which generally accompanies the formation of a large number of batteries in a single forming room. As the acid entrained atmosphere rises from the battery filled tubs, it impinges the bottom of the next higher tub whereupon it condenses and drips back into the lowermost tub. In this way, a large amount of the gases rising from the batteries being formed are captured by the apparatus and returned to the tubs. The cooling fluid, which comprises mainly water in the preferred embodiment, can be neutralized on its way back to the cooling tower. This apparatus, then, in addition to providing an economical way of forming a maximum number of batteries in a minimum amount of floor space, also serves to minimize adverse environmental impacts as a result of the formation process.

Although well adapted to its purpose, such an apparatus is still capable of further improvement. For example, the apparatus described comprises a series of tubs stacked in a vertical array in a cascading flow arrangement, connected by means of a flexible hose or tubing extending out of an upper tub, and into the next lower tub.

Such an arrangement does not permit an accurate, yet continuously variable, adjustment of the fluid level in the formation tub. Fluid level is only capable of control by regulating the fluid flow rate and by properly positioning and sizing the drainage system. Moreover, such a flow arrangement does not provide for the complete drainage of the system after use. Rather, to provide drainage, a separate drain and drain tube assembly is required.

U.S. patent application Ser. No. 046,625, filed June 8, 1979, illustrates a flow control device adapted to extend between the drains of adjacent formation tubs which have been stacked in a vertical array, and having a longitudinal slot which communicates with the fluid containing body of the lowermost tub. A concentric sleeve or collar is provided which slidingly engages the tube, variably covering the slot, thereby limiting the level of the fluid contained in the tub. Although such a drain assembly permits continuous adjustment of the fluid level in a formation tub, there still is not provided any means for completely draining the system after its use. Separate drainage therefore, is still required.

It, therefore, becomes desirable to develop a flow control device which allows for the variable control of the fluid level in a battery formation tub, and which also allows the tub to be efficiently drained after formation of the batteries has been completed.

SUMMARY OF THE INVENTION

In accordance with the present invention there is provided an improved water flow device, or drain, for use in conjunction with a series of vertically arrayed formation tubs, comprising a centrally positioned cylindrical member having a length less than the distance between the fluid outlet of an upper formation tub and the fluid outlet of a second, lower formation tub, and having vertically spaced openings or slots extending there through; a first concentric sleeve positioned to slidingly engage the lower portions of the cylindrical member and having an opening or slot positioned at its lower terminus; and a second concentric sleeve positioned to slidingly engage the upper portions of the cylindrical member.

The flow device is adapted for use with vertically aligned battery formation tubs, each comprising a rectangular tub body and a frame adapted to support such formation tubs in vertical spaced relation. The flow device is positioned between the outlet or drain of a first, upper formation tub and the outlet or drain of a second, lower formation tub.

In use, the upper most sleeve is extended vertically upwardly, engaging the drain of the upper formation tub and forcing the lower end of the cylindrical member downwardly into the drain of the lower formation tub. The lower sleeve is vertically adjusted to establish the fluid level within the lower formation tub, by covering selected portions of the slots provided in the cylindrical member, any excess fluid being permitted to exit the tub through the slots provided in the cylindrical member and out the drain of the lower formation tub. The fluid level is then easily varied as desired by varying the position of the lower sleeve.

After formation is complete, the upper sleeve is moved down over the top of the cylindrical member, and the lower sleeve is moved down, extending beyond the bottom of the cylindrical member, raising the cylindrical member out of the drain of the lower formation tub. Any fluid contained in the tub is then permitted to drain through the slot provided in the lower sleeve.

It is therefore an object of the present invention to provide an improved fluid flow device for use in conjunction with a series of battery formation tubs which have been stacked in a vertical array.

It is another object of the present invention to provide an improved fluid flow device for use in conjunction with a series of battery formation tubs which have been stacked in a vertical array which permits the level of the fluid contained within each tub to be accurately, and continuously variably regulated.

It is another object of the present invention to provide an improved fluid flow device for use in conjunction with a series of battery formation tubs which have been stacked in a vertical array, which permits the continuously variable regulation of the fluid level within the formation tubs, and which also provides a convenient means for draining the tubs after their use.

These and other subjects will become apparent from the following detailed description of the preferred embodiment of the invention, taken in view of the following drawings.

BRIEF DESCRIPTION OF THE DRAWINGS

In the several views provided, like reference numerals denote similar structure.

DETAILED DESCRIPTION OF THE PREFERRED EMBODIMENT

Figure 1:
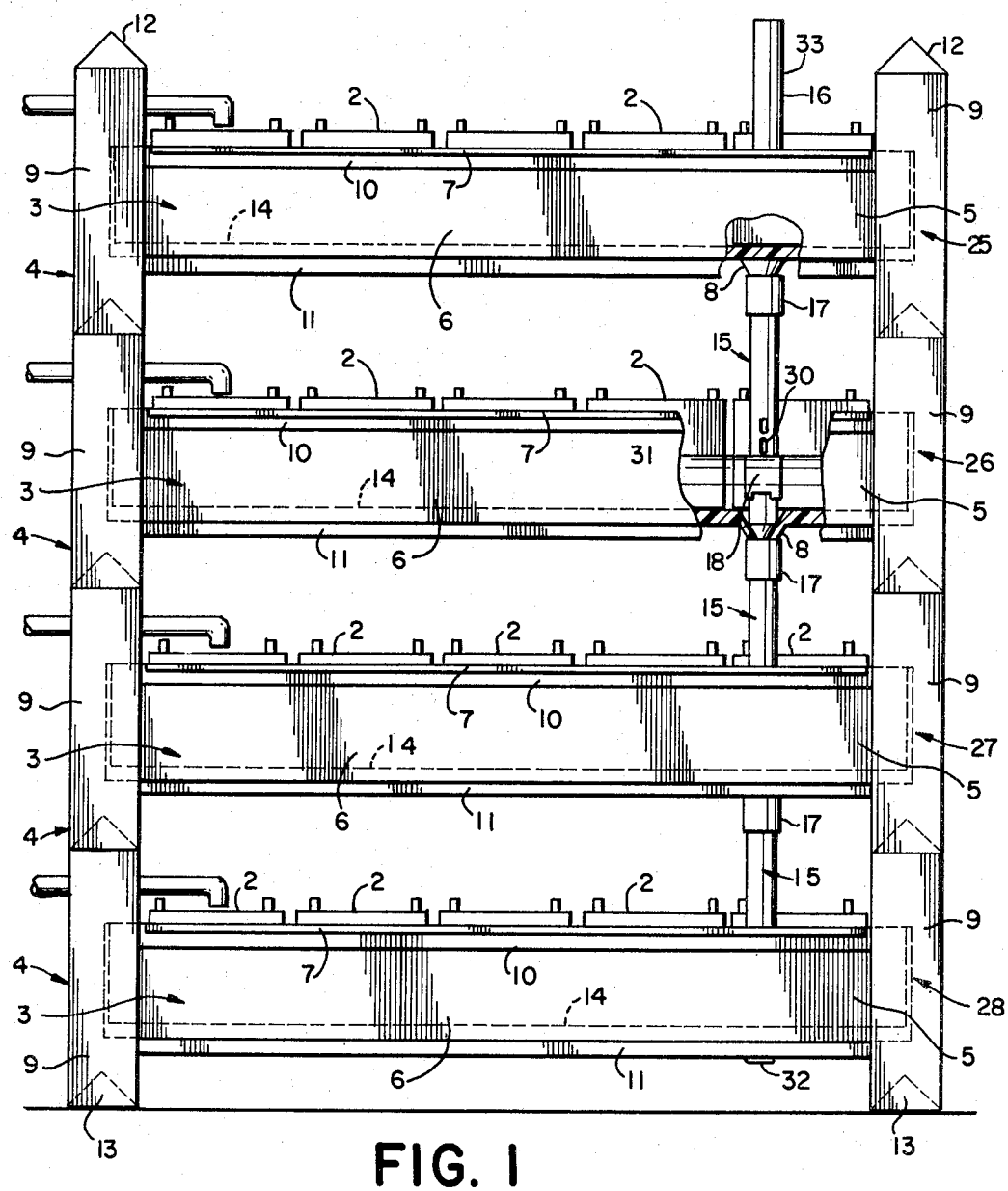
FIG. 1 is a side elevational view, partially broken away to show internal construction detail, illustrating a series of formation tubs which have been stacked in a vertical array, also illustrating the flow control device of the present invention.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 illustrates an apparatus used to form a plurality of batteries 2 generally comprising a series of formation tubs 3 stacked in a vertical array by means of frames 4.

Each formation tub 3 comprises a generally rectangular shaped tub body 5, having opposing side walls 6, at least two of which are provided with means for engaging frame 4, such as the lips 7 illustrated. Formation tub 3 also preferably comprises means (not shown) for aligning a series of batteries 2 in tub body 5 in an aligned, juxtaposed relationship, and a drain 8 which permits fluid contained within the tub body 5 to exit therefrom for delivery elsewhere.

Each frame 4 comprises a plurality of supports 9, and a plurality of side members 10 and bottom members 11 extending between and connected to supports 9 using any of a variety of known techniques. In addition to providing frame 4 with support and integrity, side members 10 and bottom members 11 also serve to support and retain tub body 5 within the frame 4. To this end, side members 10 are adapted to engage the lip 7 of the tub body 5, while the bottom members 11 engage the bottom of the tub 5. Each support 9 comprising frame 4 is further provided with a tapered portion 12 at one end, adapted to engage a mating cavity 13 provided at the opposite end of each support 9. In this manner, frame 9 is particularly well adapted for stacking upon another, similarly configured frame, to form a vertical array.

FIG. 1 illustrates operation of the present invention in conjunction with a series of formation tubs 1 which have been stacked in a vertical array. A plurality of batteries 2 to be formed have been positioned within tub body 5, preferably assisted in this process by suitable alignment means (not shown). The terminals of the batteries have been connected together, positive to negative, forming a series arrangement which is then, in turn, connected to a battery charging circuit (not shown). Each formation tub 3 is engaged and supported in position by a frame 4; the lips 7 of each tub 3 being engaged by side members 10, and the base 14 of tub 3 being engaged by bottom members 11.

The base 14 of each tub 3 is provided with a drain 8. As illustrated, the drains 8 of the formation tubs 3 are vertically aligned with respect to each other, so that the flow control device 15 of the present invention can be positioned there between, as will be more fully described below.

Figure 2:
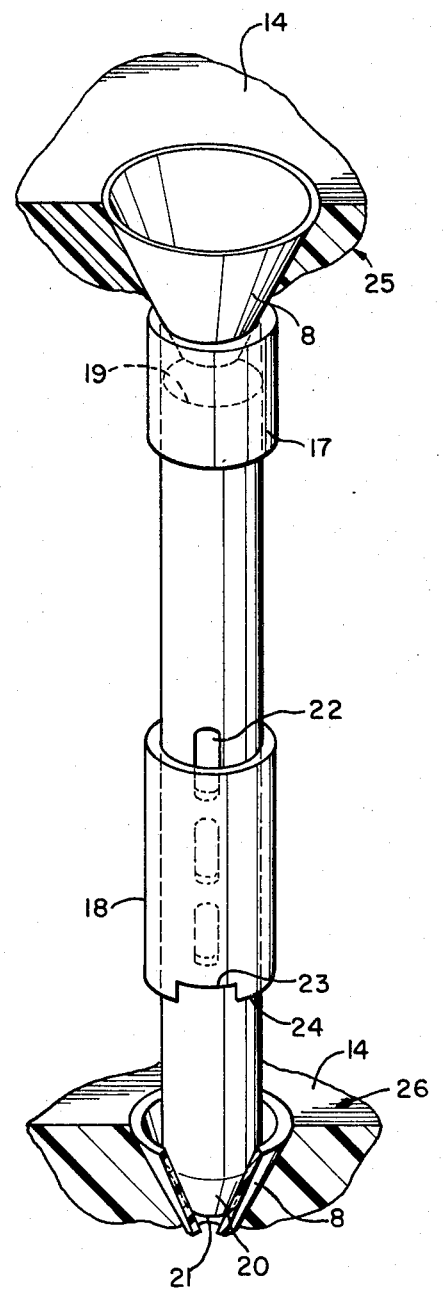
FIG. 2 is partial isometric view illustrating the use of the flow control device of the present invention to regulate the fluid level within a formation tub during battery formation.
Figure 3:
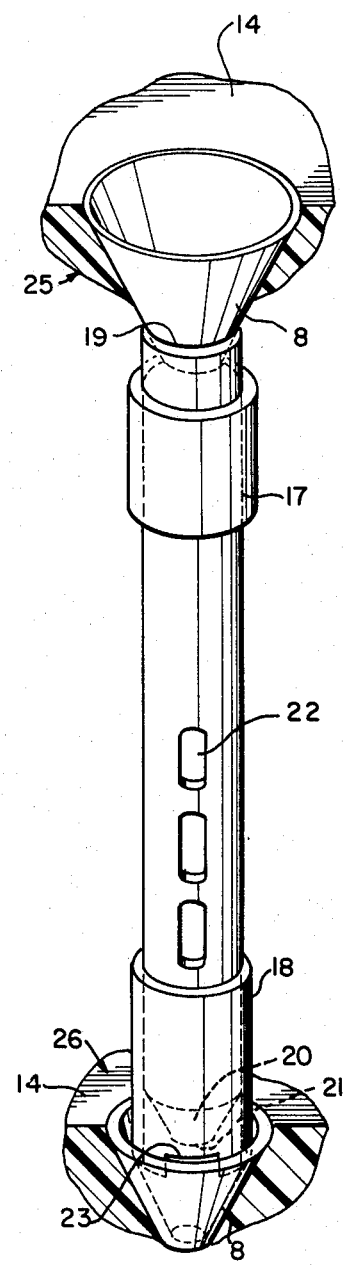
FIG. 3 is a partial isometric view illustrating the use of the flow control device of the present invention to drain the formation tub after battery formation has been completed.

FIGS. 2 and 3 illustrate the flow control device 15 of the present invention. Flow device 15 generally comprises a longitudinally extending hollow cylindrical member 16, and two concentric sleeves 17, 18 which frictionally engage the cylindrical member 16.

Member 16 terminates at its upper end in an opening 19 having a diameter substantially equal to the diameter of the member 16. Member 16 terminates at its lower end in a tapered section 20 which terminates in an opening 21 having a diameter generally less than the diameter of the member 16. Also provided in member 16 are a series of slots or openings 22 which communicate with the interior regions of member 16, and which are longitudinally positioned along member 16. Preferably, slots 22 are positioned so that the distance between the opening 21 and the series of slots 22 is equal to the maximum desired range for the fluid level to be maintained within formation tub 3.

Each sleeve 17, 18 is cylindrical in shape, having an inner diameter which permits frictional engagement with member 16. The lower sleeve 18 is provided with at least one opening or slot 23 extending radially along portions of the surface of the sleeve 18, and extending fully to its lowermost end, at 24. Additionally, lower sleeve 18 has a length sufficient to cover substantially all of the slots 22 simultaneously.

As previously described, flow control device 15 is positioned between the drains 8 of two vertically adjacent formation tubs, generally referred to as tubs 25, 26. To install flow device 15 in position all that need be done it to slide sleeve 17 downward beyond the terminating end 19 of cylindrical member 16, and to insert device 15 between formation tubs 25, 26 so that the tapered section 20 engages the drain 8 of the lower tub 26. Sleeve 17 is then raised, beyond the terminating end 19 of member 16, to engage the drain 8 of the upper formation tub 25. Upper sleeve 17, and tapered section 20 combine to securely retain flow device 15 between formation tubs 25, 26.

Referring now to FIG. 1, there is illustrated a flow device 15 which has been positioned between two adjacent formation tubs 25, 26. Additional flow devices 15 have also been positioned between other formation tubs; one flow device 15 connecting tubs 26 and 27; another, connecting tubs 27 and 28. After assembly of the apparatus 1, and connection of the batteries 2 to the charging device, the system is ready for operation.

In operation a fluid, preferably water, is introduced into tubs 25, 26, 27, 28 from a series of nozzles 29. Nozzles 29 may advantageously be connected by a manifold arrangement (not shown) drawing fluid from a single source. Since the drain 8 of each tub is closed by the tapered portion 20 of each flow device 15, each tub begins to fill with fluid. This fluid level rises until it reaches the first exposed slot 22 of member 16, shown for example at 30 for tub 26. Excess fluid then flows into exposed slot 22 and out drain 8, adjusting the fluid level in tub 26 as shown at 31. The excess fluid is then discharged from drain 8, through any flow devices 15 and drains 8 associated with lower formation tubs, eventually exiting the system at drain 32.

Water collected from drain 32 may then be delivered to a cooling tower, as is presently customarily done, which fluid may then be discharged as waste, or be recirculated for use in subsequent formation operations.

If at any time during use of the apparatus 1 it is desired to change the fluid level within any of the formation tubs (such as when a different type of battery, having for example a different height, is to be formed), all that need be done is to vary the position of sleeve 18 along cylinder 16, thereby varying the degree to which the slots 22 are covered.

After battery formation is completed, and operations are to be discontinued, it then becomes necessary to drain each of the tubs 25, 26, 27, 28 of fluid. This is accomplished as illustrated in FIG. 3. First, sleeve 17 is moved downwardly along member 16, preferably to a position beneath the opening at 19. This permits the member 16 to be moved upwardly so that the opening at 19 engages the drain 8 of the upper formation tub 25. Lower sleeve 18 is then moved downwardly until its lower edge 29 is brought into engagement with the drain 8 of the lower tub 26.

In this manner, flow device 15 is securely retained in position between tubs 25, 26, and the fluid contained within tub 26 is permitted to drain through slot 23, exiting the tub 26 at the drain 8. This process continues until the tub 26 is emptied of fluid. Reversing the above described steps returns flow device 15 to its fluid level controlling configuration, for renewed operation.

Also illustrated in FIG. 1 is a flow device 33 which is adapted for use in conjunction with the upper most formation tub 25 in the vertically stacked array. In order to connect the flow device 33 for use with the formation tub 25, the tapered section 20 is positioned within the drain 8 of tub 25, being retained in position for example by frictional engagement between the two structures. Additional support may be provided by engaging the member 16 with a frame which extends upwardly to the member 16 from the base 14 of the formation tub 25 if desired.

In operation, the fluid level within the formation tub 25 may be controlled as previously described, by suitably positioning the lower sleeve 18 along the slots 22 of member 16. Drainage of the tub 25 after its use is conveniently accomplished by removing the flow device 33 from the drain 8. Accordingly, flow device 33 need not include an upper sleeve 17 for proper operation.

The foregoing apparatus serves well to satisfy the objects previously set forth, however modifications of the flow device 15 are also clearly possible.

For example, slot 22 are shown as forming a single, vertically aligned row. It is also possible for a plurality of vertically spaced slots 22 to extend radially about member 16 in a variety of patterns, to obtain a desired fluid flow. The oval shape of slots 22 may also be varied.

Although slot 23 is shown as a single rectangular notch, other shaped slots may also be used. Moreover, a plurality of slots 23 may be positioned radially about the lower edge 29 of sleeve 18 if desired.

Sleeves 17, 18 are shown as concentric sleeves which frictionally engage member 16. Although frictional engagement is preferred, it is also possible to use a detent arrangement, or some other means for maintaining the positioning of sleeves 17, 18.

It will be understood that various changes in the details, material and arrangement of parts which have been herein described and illustrated in order to explain the nature of this invention may be made by those skilled in the art within the principle and scope of the invention as expressed in the following claims.

What is claimed is:

1. A flow control device adapted for use in conjunction with a storage battery formation tub to control fluid flow between the interior and drain of the formation tub, the flow control device comprising:
   (a) a longitudinally extending, hollow cylindrical member having a first end adapted to engage the drain of the formation tub, and having at least one aperture extending through the cylindrical member, to the interior of the cylindrical member; and
   (b) a first sleeve movable along portions of the cylindrical member and having drainage means associated therewith, the first sleeve being movable between a first and second mode so that
      (i) the first sleeve covers at least selected portions of the aperture to regulate fluid communication through the cylindrical member in the first, fluid regulating mode, and
      (ii) the first sleeve extends beyond the first end of the cylindrical member to permit fluid to exit through the drainage means in the second, fluid drainage mode.

2. The device of claim 1 wherein the first end of the cylindrical member comprises a truncated, tapered end portion terminating at a fluid outlet.

3. The device of claim 2 wherein the tapered end portion of the cylindrical member is configured to substantially prevent fluid communication between the interior and drain of the formation tub.

4. The device of claim 1 having a plurality of longitudinally spaced apertures extending through the cylindrical member.

5. The device of claim 4 wherein the first sleeve variably engages selected ones of said apertures in the first mode.

6. The device of claim 1 wherein the first sleeve comprises:
   (a) a hollow cylindrical segment concentric with the cylindrical member, and
   (b) a groove extending through the first sleeve to the edge of the segment which is nearest the first end of the device.

7. A flow control device adapted for use in conjunction with at least one of a vertically aligned array of storage battery formation tubs including at least a first and second formation tub, to control fluid flow between the interior and drain of the first, lower formation tub, the flow control device comprising:
   (a) a longitudinally extending, hollow cylindrical member having a first end adapted to engage the drain of the first formation tub, and a second end positioned beneath the drain of the second formation tub, the cylindrical member having at least one aperture extending through the cylindrical member, to the interior of the cylindrical member; and
   (b) a first sleeve movable along portions of the cylindrical member and having drainage means associated therewith, the first sleeve being movable between a first and second mode so that
      (i) the first sleeve covers at least selected portions of the aperture to regulate fluid communication through the cylindrical member in the first, fluid regulating mode, and
      (ii) the first sleeve extends beyond the first end of the cylindrical member to permit fluid to exit through the drainage means in the second, fluid drainage mode.

8. The device of claim 7 wherein the cylindrical member has a length which is less than the distance between the drains of the first and second formation tubs.

9. The device of claim 7 wherein the drains of the first and second formation tubs are in vertical spaced alignment.

10. The device of claim 7 further comprising a second sleeve movable along the second end of the cylindrical member and adapted to retractably engage the drain of the second formation tub.

11. The device of claim 10 wherein the first and second sleeves slidingly engage the cylindrical member.

12. The device of claim 11 wherein the first and second sleeves frictionally engage the cylindrical member.

13. The device of claim 10 wherein the second sleeve comprises a hollow cylindrical segment concentric with the cylindrical member.

14. A flow control device adapted for use in conjunction with a storage battery formation tub to control fluid flow between the interior and drain of the formation tub, the flow control device comprising:
   (a) a hollow member having an end adapted to engage the drain of the formation tub, and having at least one aperture extending through the member to its interior; and
   (b) a sleeve movable along portions of the member and having drainage means associated therewith, the sleeve being movable between a first and second position so that:
      (i) the sleeve covers at least portions of the aperture in the first, fluid regulating position, and
      (ii) the sleeve extends beyond the end of the member, thereby permitting fluid to flow through the drainage means, in the second, fluid drainage position.

15. A flow control device adapted for use in conjunction with at least one of a plurality of vertically arrayed storage battery formation tubs, including at least a first, lower formation tub and a second, upper formation tub, to control fluid flow between the interior and drain of the first formation tub, the flow control device comprising:

(a) a hollow member having a first end adapted to engage the drain of the first formation tub, and a second end positioned beneath the drain of the second formation tub, and having at least one aperture extending through the member to its interior; and (b) a first sleeve movable along portions of the member and having drainage means associated therewith, the first sleeve being movable between a first and second position so that:
  (i) the first sleeve covers at least portions of the aperture in the first, fluid regulating position, and
  (ii) the first sleeve extends beyond the first end of the member, thereby permitting fluid to flow through the drainage means, in the second, fluid drainage position.

16. The device of claim 13 further comprising a second sleeve movable along portions of the member adjacent the second end and capable of engaging the drain of the second formation tub.

17. A flow control device adapted for use in conjunction with at least one of a plurality of vertically arrayed storage battery formation tubs, including at least a first, lower formation tub and a second, upper formation tub, to control fluid flow between the interior and drain of the first formation tub, the flow control device comprising:

(a) a hollow member having a first end adapted to engage the drain of the first formation tub, and a second end positioned beneath the drain of the second formation tub, and having at least one aperture extending through the member to its interior; and (b) a sleeve movable along portions of the member adjacent the second end and capable of engaging the drain of the second formation tub.

* * * * *